United States Patent
Levin

(10) Patent No.: US 9,238,978 B2
(45) Date of Patent: *Jan. 19, 2016

(54) METHOD AND DEVICE FOR WASTE-WATER PURIFICATION

(75) Inventor: Alexander Levin, Binyamina (IL)

(73) Assignee: Elcon Recycling Center (2003) Ltd., Haifa (IL)

( * ) Notice: Subject to any disclaimer, the term of this patent is extended or adjusted under 35 U.S.C. 154(b) by 1549 days.

This patent is subject to a terminal disclaimer.

(21) Appl. No.: 12/438,950

(22) PCT Filed: Aug. 31, 2006
(Under 37 CFR 1.47)

(86) PCT No.: PCT/IL2006/001016
§ 371 (c)(1),
(2), (4) Date: Jan. 20, 2010

(87) PCT Pub. No.: WO2008/026196
PCT Pub. Date: Mar. 6, 2008

(65) Prior Publication Data
US 2010/0282592 A1  Nov. 11, 2010

(51) Int. Cl.
  *B01D 3/06* (2006.01)
  *F01K 3/18* (2006.01)
  *B01D 3/04* (2006.01)
  *B01D 3/10* (2006.01)
  *C02F 1/04* (2006.01)
  *C02F 1/20* (2006.01)
  *C02F 1/66* (2006.01)
  *C02F 101/32* (2006.01)

(52) U.S. Cl.
CPC . *F01K 3/188* (2013.01); *B01D 3/04* (2013.01); *B01D 3/103* (2013.01); *C02F 1/048* (2013.01); *C02F 1/20* (2013.01); *C02F 1/66* (2013.01); *C02F 2101/322* (2013.01)

(58) Field of Classification Search
CPC ........................................................ B01D 3/04
USPC ......................................................... 210/750
See application file for complete search history.

(56) References Cited

U.S. PATENT DOCUMENTS

| 2,119,721 A | 6/1938 | Richardson |
| 4,594,131 A | 6/1986 | Maier |

(Continued)

FOREIGN PATENT DOCUMENTS

| DE | 4114386 | 11/1992 |
| EP | 0354656 | 2/1990 |
| WO | WO 2008/026196 | 3/2008 |

OTHER PUBLICATIONS

Official Action Dated Dec. 22, 2010 From the US Patent and Trademark Office Re. U.S. Appl. No. 12/779,183.

(Continued)

*Primary Examiner* — Tony G Soohoo
*Assistant Examiner* — Peter Keyworth

(57) ABSTRACT

Disclosed are systems and methods useful in waste processing. Disclosed is the use of a regenerative thermal oxidation (RTO) unit for production of industrially useable steam. Disclosed are systems including a stripping unit associated with a regenerative thermal oxidation (RTO) unit so that the stripping unit provides fuel for the RTO unit and the RTO unit provides a stripping gas for the stripping unit. Disclosed are systems including an RTO unit providing steam to operate a vapor condensation (VC) unit.

17 Claims, 12 Drawing Sheets

(56) References Cited

U.S. PATENT DOCUMENTS

| | | | |
|---|---|---|---|
| 4,898,107 A * | 2/1990 | Dickinson | 110/346 |
| 5,190,668 A * | 3/1993 | Chuang | 210/750 |
| 5,589,142 A | 12/1996 | Gribbon | |
| 5,955,037 A | 9/1999 | Holst et al. | |
| 6,504,051 B1 | 1/2003 | Miller, Jr. et al. | |
| 6,790,313 B1 * | 9/2004 | Sandquist et al. | 162/15 |
| 6,878,188 B2 | 4/2005 | Yi | |
| 7,214,349 B2 | 5/2007 | Holst et al. | |
| 7,455,781 B2 | 11/2008 | Levin | |
| 7,722,775 B2 | 5/2010 | Levin | |
| 7,771,514 B1 | 8/2010 | Johnsgard et al. | |
| 2003/0075514 A1 * | 4/2003 | Hazlebeck et al. | 210/761 |
| 2003/0221725 A1 * | 12/2003 | Greco | 137/309 |
| 2006/0196358 A1 | 9/2006 | Levin | |
| 2009/0057229 A1 | 3/2009 | Levin | |
| 2010/0219132 A1 | 9/2010 | Levin | |

OTHER PUBLICATIONS

Communication Pursuant to Article 94(3) EPC Dated Jul. 24, 2009 From the European Patent Office Re.: Application No. 06780452.6.

International Search Report Dated Jan. 18, 2008 From the International Searching Authority Re.: Application No. PCT/IL2006/001016.

Official Action Dated Aug. 9, 2007 From the US Patent and Trademark Office Re.: U.S. Appl. No. 11/073,475.

Official Action Dated Apr. 17, 2009 From the US Patent and Trademark Office Re.: U.S. Appl. No. 12/298,968.

Written Opinion Dated Jan. 18, 2008 From the International Searching Authority Re.: Application No. PCT/IL2006/001016.

Notice of Allowance Dated Jan. 13, 2010 From the US Patent and Trademark Office Re.: U.S. Appl. No. 12/289,968.

Communication Pursuant to Article 94(3) EPC Dated Apr. 18, 2012 From the European Patent Office Re. : Application No. 06780452.6.

Notice of Allowance Dated Jun. 8, 2012 From the US Patent and Trademark Office Re. U.S. Appl. No. 12/779,183.

Response Dated May 23, 2011 to Official Action of Dec. 22, 2010 From the US Patent and Trademark Office Re. U.S. Appl. No. 12/779,183.

Official Action Dated Sep. 21, 2011 From the US Patent and Trademark Office Re. U.S. Appl. No. 12/779,183.

* cited by examiner

METHOD AND DEVICE FOR WASTE-WATER PURIFICATION

RELATED APPLICATIONS

This Application is a National Phase of PCT Patent Application No. PCT/IL2006/001016 having International filing date of Aug. 31, 2006. The contents of the above Application are all incorporated herein by reference.

FIELD AND BACKGROUND OF THE INVENTION

The present invention relates to the field of waste processing and specifically to systems and methods useful in processing wastewater contaminated by volatile compounds, especially mixtures of volatile compounds and wastewater also contaminated with non-volatile materials such as salts and metal ions.

Industrial wastewater is often contaminated with harmful compounds including volatile organic or inorganic compounds as well as non-volatile harmful compounds such as detergents, salts and metal ions. As it is unacceptable to dispose of contaminated wastewater in the environment, a significant proportion of the cost for operating an industrial plant is directed to processing wastewater to neutralize the environmental and health dangers that the contaminated wastewater poses. In general, industrial wastewater is neutralized by processes that a) convert the environmentally harmful contaminants to products releasable into the environment and/or b) concentrate the environmentally harmful contaminants into as small a volume as possible for cheap internment.

It is well known in the art to remove volatile compounds from industrial wastewater or other contaminated aqueous streams by a process called steam stripping. In steam stripping, steam is externally generated and used as a stripping gas to remove volatile components from the wastewater into a vapor phase by direct contact with the wastewater inside a stripping column. The vapor phase is condensed to provide a water phase and a volatile compound phase. The volatile compound phase is separated from the water phase in a decanter vessel and incinerated or further processed for recovery while the water phase is typically combined with additional wastewater for an additional stripping step. The wastewater is stripped one or more times until relatively pure water is produced which can be released into the environment at low cost.

Steam stripping is commonly used to treat wastewater contaminated with a single volatile compound or a relatively well-defined mixture of volatile compounds, such as a specific solvent in amounts of up to about 1% by weight (about 10 gram per liter). In such cases, recovery, isolation and sale of the volatile compounds allows a reduction in the cost of operating the steam stripping unit. Thus, a steam stripping unit is advantageously used together with a single specific industrial process to recycle solvents from wastewater produced by the process.

Steam stripping is less efficient for treating wastewater containing complex mixtures of volatile contaminants, for example as may be found in dedicated waste processing plants that receive and process wastewater from multiple sources with ill-defined and changing contaminants. The volatile compound phase recovered from the vapor is a complex and ill-defined mixture of volatile compounds. In some cases, it is economically advantageous to isolate and purify specific components of the mixture, for example by distillation, but most often the components of such complex mixtures are destroyed by incineration. When the mixture includes volatile compounds that produce harmful incineration products such volatile inorganics and halogen-containing organics (e.g., chlorinated and brominated solvents) there is an added expense of scrubbers and traps for processing the wastewater.

Steam-stripping is even less suitable for processing wastewater including non-volatile contaminants, for instance wastewater including detergents, salts, buffers and metal ions in addition to volatile organic and inorganic contaminants. Steam-stripping separates the volatile contaminants from the waste water but at a higher cost: volatilization of volatile compounds from wastewater including a significant proportion of non-volatile contaminants requires more energy and there is increased sediment build up in the stripping column which requires significant maintenance. In any case, in the best case what is achieved is a minor reduction of the volume of the wastewater that still includes the non-volatile contaminants and must be further processed.

There is a need for an efficient and relatively cheap method for processing wastewater, especially wastewater including mixtures of volatile contaminants or including non-volatile contaminants together with volatile contaminants that is superior to methods known in the art.

SUMMARY OF THE INVENTION

Embodiments of the present invention successfully address at least some of the needs of the prior art by providing systems and methods for efficiently processing wastewater. Embodiments of the present invention provide a cheap source of steam for driving a steam stripping unit useful in treating wastewater. Embodiments of the present invention provide a cheap source of steam for driving a vapor compression unit useful in treating brine to provide fresh water. Embodiments of the present invention provide a method of treating wastewater that includes non-volatile and/or volatile contaminants. Embodiments of the present invention provide for the capture of at least some toxic or corrosive oxidation products produced during wastewater processing.

According to the teachings of the present invention there is provided for the use of a regenerative thermal oxidation (RTO) unit for production of industrially useable steam.

In embodiments, the produced steam is used as a stripping gas in a steam stripping unit.

In embodiments, the RTO unit receives process air from a steam stripping unit, substantially vapor including steam and the stripped volatile components.

In embodiments the process air received from the steam stripping unit comprises sufficient oxidizable components so that the RTO unit produces substantially sufficient steam for operation of the steam stripping unit.

In embodiments, the produced steam is used to drive a vapor condensation unit.

In embodiments, the produced steam is used to drive a vapor condensation unit. In embodiments, the process air received from the steam stripping unit comprises sufficient oxidizable components so that the RTO unit produces substantially sufficient steam for operation of the steam stripping unit and the vapor condensation unit. In embodiments, the process air received from the steam stripping unit comprises sufficient oxidizable components so that the RTO unit produces substantially sufficient steam for operation of the steam stripping unit and the vapor condensation unit, excepting energy for driving a compressor of the VC unit.

In embodiments, the produced steam is used to drive a vapor condensation unit for extraction of water from brine, in embodiments including brine produced by the steam stripping unit.

According to the teachings of the present invention there is also provided a method of producing industrially useable steam comprising, a) providing a vapor comprising steam and combustible compounds to a regenerative thermal oxidation (RTO) unit; and b) oxidizing the combustible compounds together with the steam in the RTO unit so as to increase the energy content of the steam thereby producing industrially useable steam.

In embodiments, the providing of the vapor comprises directing a vapor exhaust from a steam stripping unit to the RTO unit.

In embodiments, the method further comprises c) directing the industrially useable steam to a steam stripping unit as a stripping gas.

According to the teachings of the present invention there is also provided a method for removing volatile compounds from water contaminated with such volatile compounds, comprising: a) stripping volatile compounds from water contaminated therewith by contacting the water with a flow of steam in a steam stripping unit to produce a vapor of steam and the volatilized volatile compounds; b) oxidizing the volatile compounds in the vapor in a regenerative thermal oxidation (RTO) unit so as to increase the energy content of the steam in the vapor; and c) directing at least a portion of the increased-energy steam to the steam stripping unit to effect further stripping of volatile compounds from water in (a).

In embodiments, the amount of the heated steam produced in (c) is sufficient to strip the volatile compounds in (a) with substantially no addition of externally produced steam.

In embodiments, the volatile compound content of the wastewater is such that the increased energy steam produced in (c) is sufficient to strip the VOC in (a) with substantially no addition of externally produced steam. In embodiments, the volatile compound content of the water is at least about 10 gram $l^{-1}$.

In embodiments, the water comprises non-volatile contaminants.

In embodiments, during (a), a base (e.g., NaOH) is added to increase the pH of the water.

According to the teachings of the present invention there is also provided a system for processing wastewater, comprising: a) a stripping unit, comprising a stripping column, a stripping gas inlet and a stripping unit exhaust; and b) a regenerative thermal oxidation (RTO) unit, comprising a process air inlet and an RTO exhaust wherein the RTO exhaust is in fluid communication with the stripping gas inlet.

In embodiments, the RTO unit and the stripping unit are configured to drive exhaust from the RTO into the stripping gas inlet as a stripping gas when operating.

In embodiments, the stripping unit is a steam stripping unit. In embodiments, the stripping gas inlet is a steam inlet.

In embodiments, the stripping unit exhaust is in fluid communication with the process air inlet.

In embodiments, the RTO unit and the stripping unit are configured to drive exhaust from the stripping unit into the process air inlet as a portion of RTO unit process air when operating.

In embodiments, the stripping unit is a batch stripping unit comprising a sump. In embodiments, the system comprises a reagent addition port functionally associated with the sump.

In embodiments, the stripping unit is a continuous flow stripping unit.

According to the teachings of the present invention there is provided a method for removing water from brine, comprising: a) oxidizing volatile compounds in a vapor comprising steam and the volatile compounds in a regenerative thermal oxidation (RTO) unit so as to increase the energy content of the steam in the vapor; and b) directing at least a portion of the increased-energy steam to a vapor compression (VC) unit to drive the VC unit to remove water from the brine.

According to the teachings of the present invention there is provided a system for processing brine, comprising: a) a regenerative thermal oxidation (RTO) unit, comprising a process air inlet and an RTO exhaust; and b) a vapor compression (VC) unit, comprising a steam inlet and a flash chamber wherein the RTO exhaust is in fluid communication with the VC unit steam inlet.

In embodiments, the flash chamber comprises a vacuum producing component for operation of the flash chamber at reduced pressure.

In embodiments, the flash chamber is configured for operation at atmospheric pressure.

According to the teachings of the present invention there is provided a method for processing water, comprising: a) stripping volatile compounds from water contaminated therewith by contacting the water with a flow of steam in a steam stripping unit to produce a vapor of steam and the volatilized volatile compounds; and b) oxidizing the volatile compounds in the vapor in a regenerative thermal oxidation (RTO) unit so as to increase the energy content of the steam in the vapor; and c) directing the increased-energy steam to a vapor compression (VC) unit to drive the VC unit to remove water from a brine.

In embodiments, the brine comprises a byproduct of (a).

In embodiments, the method further comprises directing at least a portion of the increased-energy steam to the steam stripping unit to effect further stripping of volatile compounds from water in (a).

In embodiments, the amount of the increased-energy steam produced in (b) is sufficient to drive the VC unit with substantially no addition of externally produced steam. In embodiments, the amount of the increased-energy steam produced in (b) is sufficient to drive the VC unit with substantially no addition of externally produced steam, excepting energy necessary to drive a compressor of the VC unit.

In embodiments, the amount of the increased-energy steam produced in (b) is sufficient to strip the volatile compounds in (a) with substantially no addition of externally produced steam.

In embodiments, the volatile compound content of the water is such that the increased-energy steam produced in (b) is sufficient to strip the volatile compounds in (a) with substantially no addition of externally produced steam.

In embodiments, the volatile compound content of the water is at least about 10 gram $l^{-1}$.

In embodiments, the water comprises non-volatile contaminants.

In embodiments, the method further comprises during (a), adding a base to increase the pH of the water.

According to the teachings of the present invention there is provided a system for processing wastewater, comprising: a) a stripping unit, a stripping column, a stripping gas inlet and a stripping unit exhaust; and b) a regenerative thermal oxidation (RTO) unit, comprising a process air inlet and an RTO exhaust; and c) a vapor compression (VC) unit, comprising a steam inlet and a flash chamber wherein the stripping unit exhaust is in fluid communication with the process air inlet and wherein the RTO exhaust is in fluid communication with the VC unit steam inlet.

In embodiments, the flash chamber comprises a vacuum producing component for operation at reduced pressures.

In embodiments, the flash chamber is configured for operation of the flash chamber at atmospheric pressure.

In embodiments, the RTO exhaust is in fluid communication with the stripping gas inlet.

In embodiments, the RTO unit and the stripping unit are configured to drive exhaust from the RTO into the stripping gas inlet as a stripping gas when operating.

In embodiments, the stripping unit is a steam stripping unit. In embodiments, the stripping gas inlet is a steam inlet.

In embodiments, the RTO unit and the stripping unit are configured to drive exhaust from the stripping unit into the process air inlet as a portion of RTO unit process air when operating.

In embodiments, the stripping unit is a batch stripping unit comprising a sump. In embodiments, the system comprises a reagent addition port functionally associated with the sump.

In embodiments, the stripping unit is a continuous flow stripping unit.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of embodiments of the present invention only, and are presented in the cause of providing what is believed to be a useful and readily understood description of the principles and conceptual aspects of the invention. In this regard, no attempt is made to show structural details of the embodiments in more detail than is necessary for a fundamental understanding of the invention, the description taken with the drawings making apparent to those skilled in the art how several forms of the invention may be embodied in practice.

In the drawings.

EMBODIMENTS OF THE INVENTION

Figure 1A:
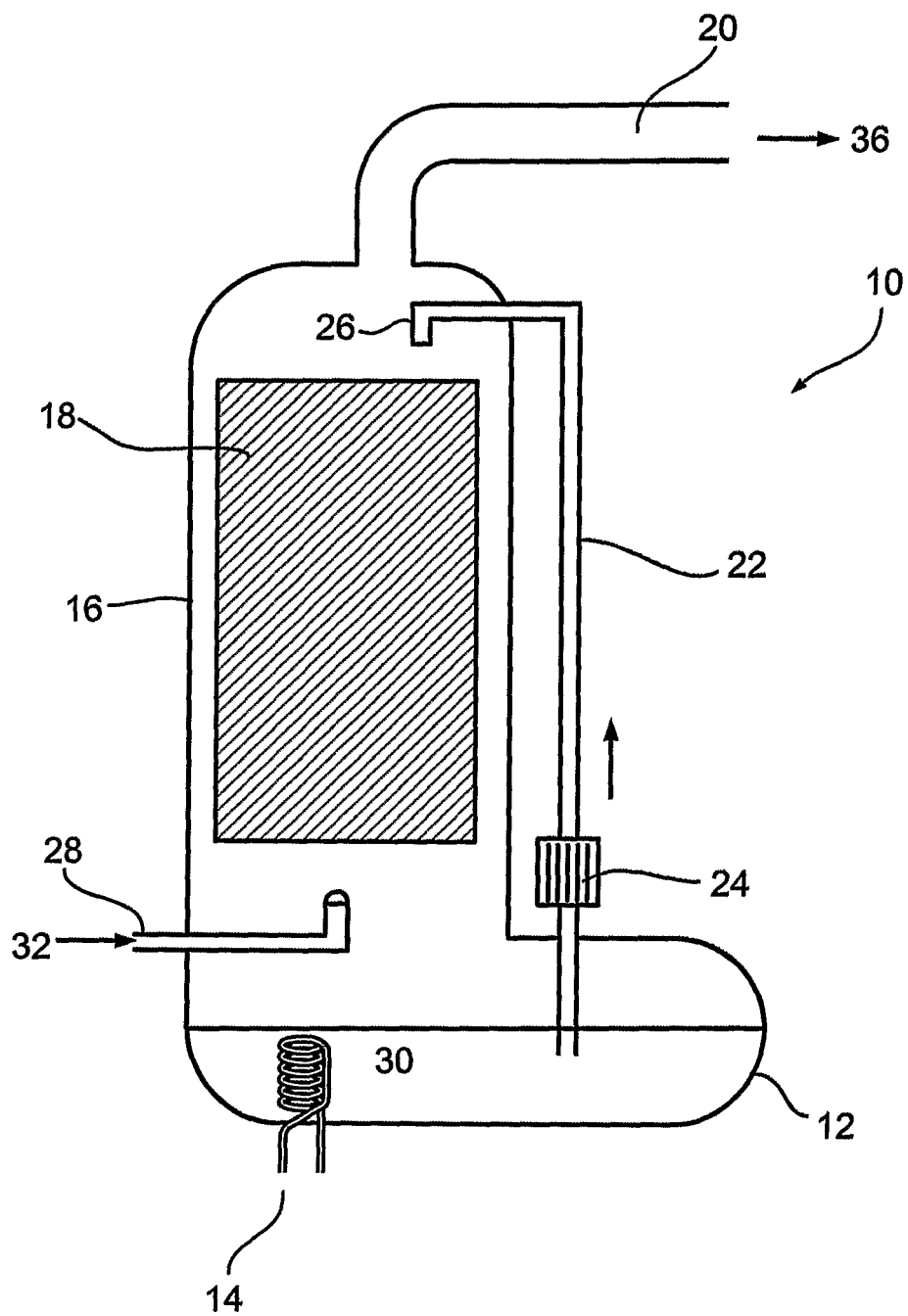
FIGS. 1A, 1B and 1C are schematic depictions of stripping units useful in implementing the teachings of the present invention.

The present invention is of the use of a regenerative thermal oxidation unit for the production of industrially useable steam, for instance for driving a vapor compression unit for purifying water or for use as a stripping gas. The present invention is also of methods and systems for treating wastewater that include the destruction of volatile compounds in wastewater. Embodiments of the present invention are characterized as being relatively cheap to operate. In an aspect of the present invention, a stripping unit, especially a steam stripping unit, is used to provide fuel for a regenerative thermal oxidation unit which provides energy to generate more stripping gas for the stripping unit. In an aspect of the present invention, a regenerative thermal oxidation unit provides energy to a mechanical compression unit to generate steam. In embodiments, steam from a mechanical compression unit is returned to a stripping unit as a stripping gas.

The principles and uses of the teachings of the present invention may be better understood with reference to the accompanying description and figures. In the figures, like reference numerals refer to like parts throughout.

Before explaining at least one embodiment of the invention in detail, it is to be understood that the invention is not limited in its application to the details set forth herein. The invention can be implemented with other embodiments and can be practiced or carried out in various ways. It is also understood that the phraseology and terminology employed herein is for descriptive purpose and should not be regarded as limiting.

Generally, the nomenclature used herein and the procedures utilized in the present invention include techniques from the fields of chemistry, engineering, material sciences, thermodynamics, waste processing and physics. Such techniques are thoroughly explained in the literature.

Unless otherwise defined, all technical and scientific terms used herein have the same meaning as commonly understood by one of ordinary skill in the art to which the invention belongs. In addition, the descriptions, materials, methods, and examples are illustrative only and not intended to be limiting. Methods and materials similar or equivalent to those described herein can be used in the practice or testing of the present invention.

As used herein, the terms "comprising" and "including" or grammatical variants thereof are to be taken as specifying the stated features, integers, steps or components but do not preclude the addition of one or more additional features, integers, steps, components or groups thereof. This term encompasses the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed system, device or method.

As used herein, "a" or "an" mean "at least one" or "one or more". The use of the phrase "one or more" herein does not alter this intended meaning of "a" or "an".

As used herein, the term "method" refers to manners, means, techniques and procedures for accomplishing a given task including, but not limited to, those manners, means, techniques and procedures either known to, or readily developed from known manners, means, techniques and procedures by practitioners of the chemical, engineering and waste processing arts. Implementation of the methods of the present invention involves performing or completing selected tasks or steps manually, automatically, or a combination thereof.

For clarity, herein the following standard abbreviations will occasionally be used:

VOC to refer to volatile organic compound;
VC to refer to vapor compression;
RTO to refer to regenerative thermal oxidation; and
TVR to refer to thermal vapor compression.

The systems of the present invention are based on combinations of variations of waste processing units known in the art, combinations that in embodiments provide highly efficient systems for wastewater processing. The waste processing units combined in accordance with the teachings of the present invention to make up systems of the present invention are stripping units, regenerative thermal oxidation units, and mechanical vapor compression units. The methods of the present invention are substantially based on using systems of the present invention to process wastewater.

Stripping Unit

Stripping is a wastewater purification process that receives water contaminated with relatively low amounts (up to about 1%) of volatile contaminants, such as industrial wastewater streams and even contaminated groundwater, especially VOCs and extracts the volatile compounds from the wastewater. Stripping is so efficient that it is possible to remove substantially all volatile components from the water, including gases such as oxygen and $CO_2$, yielding pure water. The extracted volatile compounds are generally incerated or recovered for use.

Most generally, a stripping unit operates by passing a heated stripping gas (air or steam) past wastewater containing volatile compounds such as VOCs. Contact with the stripping gas heats the wastewater and carries away the volatile compounds released from the wastewater. Stripping efficiently removes the volatile compounds for two primary reasons: the solubility of a gas in a solution decreases as the partial pressure of the gas above the solution decreases (Henry's Law) and the solubility of a gas in a solution decreases as the temperature of the solution increases. Steam stripping is generally more efficient and is able to strip less volatile compounds than air stripping.

A batch steam stripping unit 10 useful in implementing embodiments of the present invention is schematically depicted in FIG. 1A. Steam stripping unit 10 includes a sump 12 provided with heat exchanger 14 and in fluid communication with a stripping column 16 filled with packing 18 and provided with exhaust 20. Conduit 22 provided with pump 24 is configured to transport wastewater from sump 12 to spray nozzle 26 directed at the top of packing 18. Steam inlet 28 is located at the bottom of stripping column 16 and is configured to provide a flow of steam up stripping column 16 through packing 18.

In a typical stripping process, wastewater 30 is introduced into sump 12 and pumped through conduit 22 with the help of pump 24. Pump 24 forces wastewater 30 out through spray nozzle 26 to flow down along packing 18 in thin films so as to increase the surface area of wastewater 30 in stripping column 16. Simultaneously, steam is directed out through steam inlet 28 and up stripping column 16 through packing 18 towards exhaust 20. When passing through packing 18, the steam heats wastewater 30 volatilizing and carrying away volatile compounds therein by direct contact. The resulting vapor phase of volatile compound laden steam exits stripping unit 10 through exhaust 20.

Stripped wastewater 30 gathers in sump 12 and is cycled back for further stripping steps in stripping column 16 until the concentration of volatile compounds is reduced to a desired level. When stripping is complete, the volatile compound free wastewater 30 is removed from sump 12 for further processing.

To increase the efficiency of the stripping process, wastewater 30 in sump 12 is typically heated with the help of heat exchanger 14.

Figure 1B:
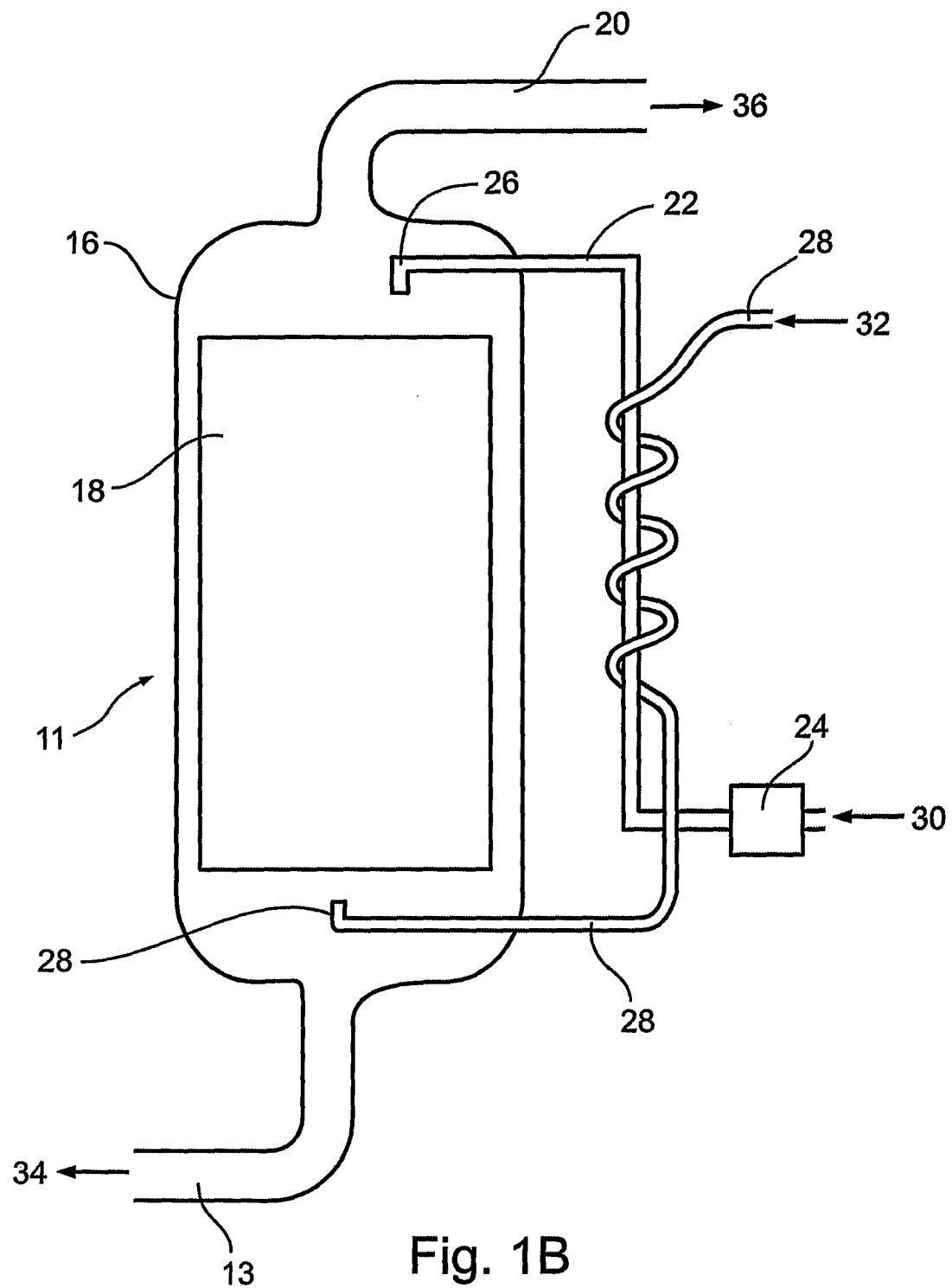

A continuous flow steam stripping unit 11 useful in implementing embodiments of the present invention is schematically depicted in FIG. 1B. Steam stripping unit 11 includes a stripping column 16 filled with packing 18 and provided with exhaust 20 and stripped water drain 13. Steam inlet 28 is located at the bottom of stripping column 16 and is configured to provide a flow of steam 32 up stripping column 16 through packing 18. Wastewater 30 is directed to spray nozzle 26 directed at the top of packing 18 by conduit 22 provided with pump 24. In steam stripping unit 11, wastewater passing through conduit 22 is heated by energy provided by steam that is directed to steam inlet 28, although in non-depicted embodiments, wastewater passing through conduit 22 is not heated or is heated by a source of energy other than steam directed to steam inlet 28.

In a typical stripping process, wastewater 30 is continuously pumped through conduit 22 with the help of pump 24. Pump 24 forces wastewater 30 out through spray nozzle 26 to flow down along packing 18 in thin films so as to increase the surface area of wastewater 30 in stripping column 16. Simultaneously, steam is directed out through steam inlet 28 and up stripping column 16 through packing 18 towards exhaust 20. When passing through packing 18, the steam heats wastewater 30 volatilizing and carrying away volatile compounds therein by direct contact. The resulting vapor phase of volatile compound laden steam exits stripping unit 10 through exhaust 20. Stripped wastewater 30 is continuously transported away through drain 13 for further processing.

Unlike in batch steam stripping unit 10 depicted in FIG. 1A, in continuous flow steam stripping unit 11 each portion of wastewater is stripped only once. One skilled in the art is able to calculate the volume, geometry and nature of packing 18, the temperature and volume of steam 32 as well as other salient parameters required to strip substantially all volatile components from wastewater 30 without undue experimentation.

Figure 1C:
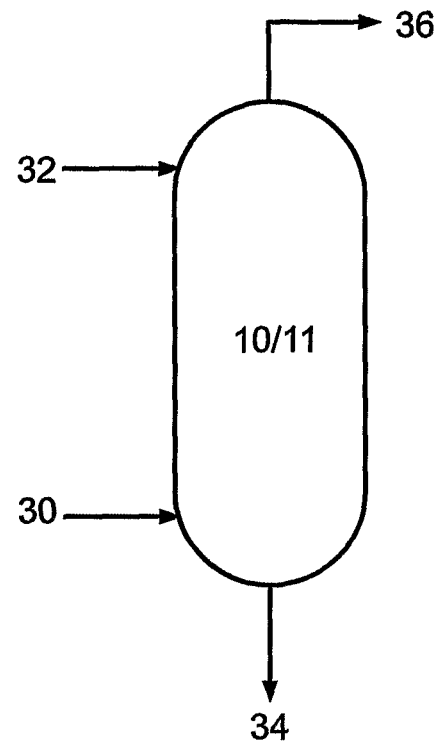

Schematically, a stripping unit 10 or 11 receives wastewater 30 including volatile compounds and steam 32, and releases volatile compound free wastewater 34 and a vapor 36 including the volatilized volatile compounds and steam, see FIG. 1C.

Regenerative Thermal Oxidation Unit

Regenerative Thermal Oxidation (RTO) is a process used to purify air in industrial settings by efficiently destroying solvents and other organic compounds by oxidation. RTO offers superior heat recovery characteristics when compared to other oxidation systems by using recovered energy from oxidized compounds to preheat incoming process air to oxidation temperatures, lowering operating costs. RTO is particularly effective for process streams with low fuel loading.

Most generally, an RTO unit operates by passing process air including volatile combustible compounds through a hot heat exchanger which transfers heat to the process air. The thus preheated process air passes through an oxidizer (e.g., thermal oxidizer, flare oxidizer, thermocatalytic oxidizer), generating a hot exhaust. The hot exhaust passes through a cool heat exchanger, heating the cool heat exchanger before being released. In such a way, the heat released by oxidation of a given portion of volatile combustible compounds is recycled to increase oxidation efficiency of a following portion of volatile combustible compound. If needed, oxygen and auxiliary fuel is added to ensure a clean burning fuel-air mixture. RTO is a very efficient process, typically having destruction efficiencies of greater than 99%, generally between 99.9% and 99.999%.

Figure 2:
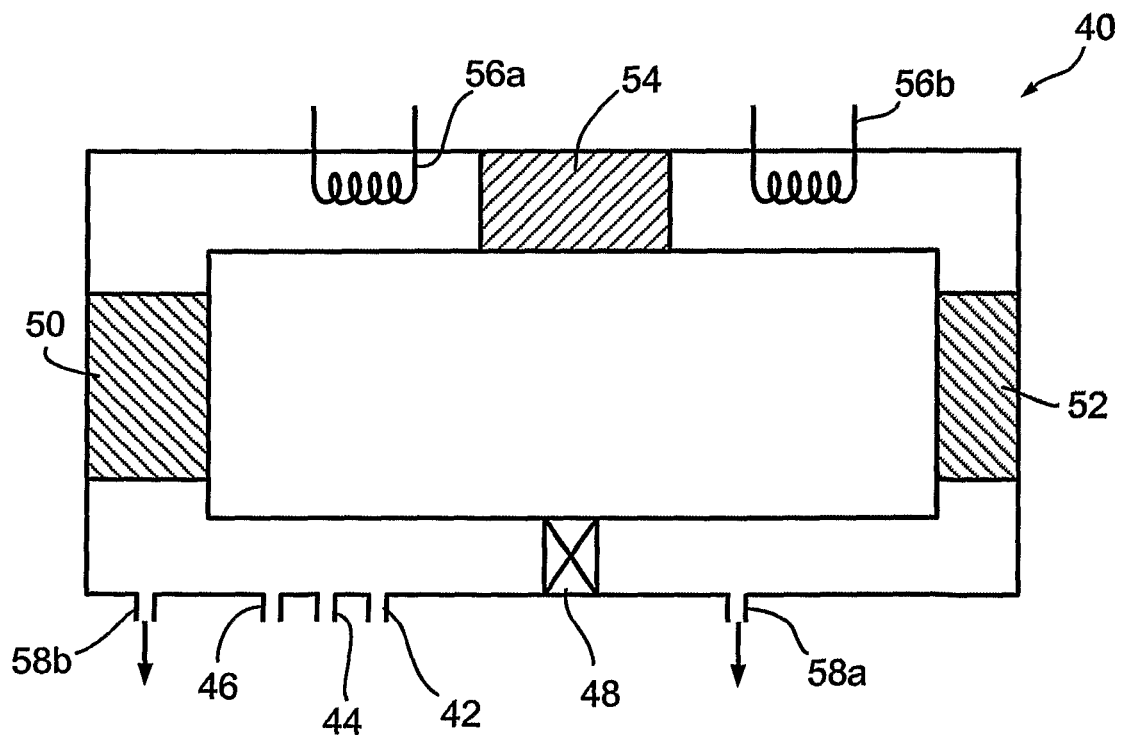
FIG. 2 is a schematic depiction of a regenerative thermal oxidation unit useful in implementing the teachings of the present invention.

A regenerative thermal oxidation (RTO) unit 40 useful in implementing embodiments of the present invention is schematically depicted in FIG. 2. RTO unit 40 comprises a circular chamber provided with an process air inlet 42, an oxidation agent inlet 44, an auxiliary fuel inlet 46, a reversible fan 48, two heat exchangers 50 and 52 on either side of an oxidizer 54 (e.g., thermal oxidizer, flare oxidizer, thermocatalytic oxidizer), heating elements 56a and 56b and exhausts 58a and 58b.

For use, process air including volatile contaminants, oxidation agent (e.g., air or oxygen) and, if needed, auxiliary fuel are introduced through inlets 42, 44 and 46 respectively to form a fuel air mixture. Fan 48 is activated so as to drive the fuel air mixture through RTO unit 40 in a clockwise fashion through heat exchanger 50 towards oxidizer 54. During the passage through heat exchanger 50, the fuel air mixture flows through heat exchanger 50, receiving heat therefrom. The heated fuel air mixture passes through oxidizer 54 and is converted to an exhaust gas wherein substantially all of the fuel in the fuel air mixture is oxidized. The heat produced by the oxidation is carried by the exhaust gas through heat exchanger 52 towards exhaust 58a. During passage through heat exchanger 52, the exhaust gas deposits heat in heat exchanger 52. When heat exchanger 52 is deemed sufficiently hot, fan 48 is reversed so as to drive a fuel air mixture in a counter clockwise so as to receive heat from heat exchanger 52, pass through oxidizer 54 and deposit heat in heat exchanger 50 before passing out through exhaust 58b. When there is insufficient heat in heat exchangers 50 and 52 for efficient oxidation, heating elements 56a and 56b are activated to preheat the fuel air mixture.

Substantially, an RTO unit receives air contaminated with combustible materials, adds auxiliary fuel and oxidizing agent if needed, and releases clean air and excess heat.

Vapor Compression Unit

Vapor compression (VC) is a process used to concentrate brine by removing water as steam from the brine. Brine is heated at reduced pressure (i.e., a "flash chamber") so as to produce water vapor. The water vapor is compressed, leading to heating of the vapor. The vapor is condensed by heat transfer to the brine, so that the brine is heated while the vapor condenses to produce fresh water. VC is a highly efficient process: production of 500 liter of fresh water from 1 m$^3$ of sea water typically requires about 10 kWh instead of about 700 kWh required by a distillation process.

Figure 3A:
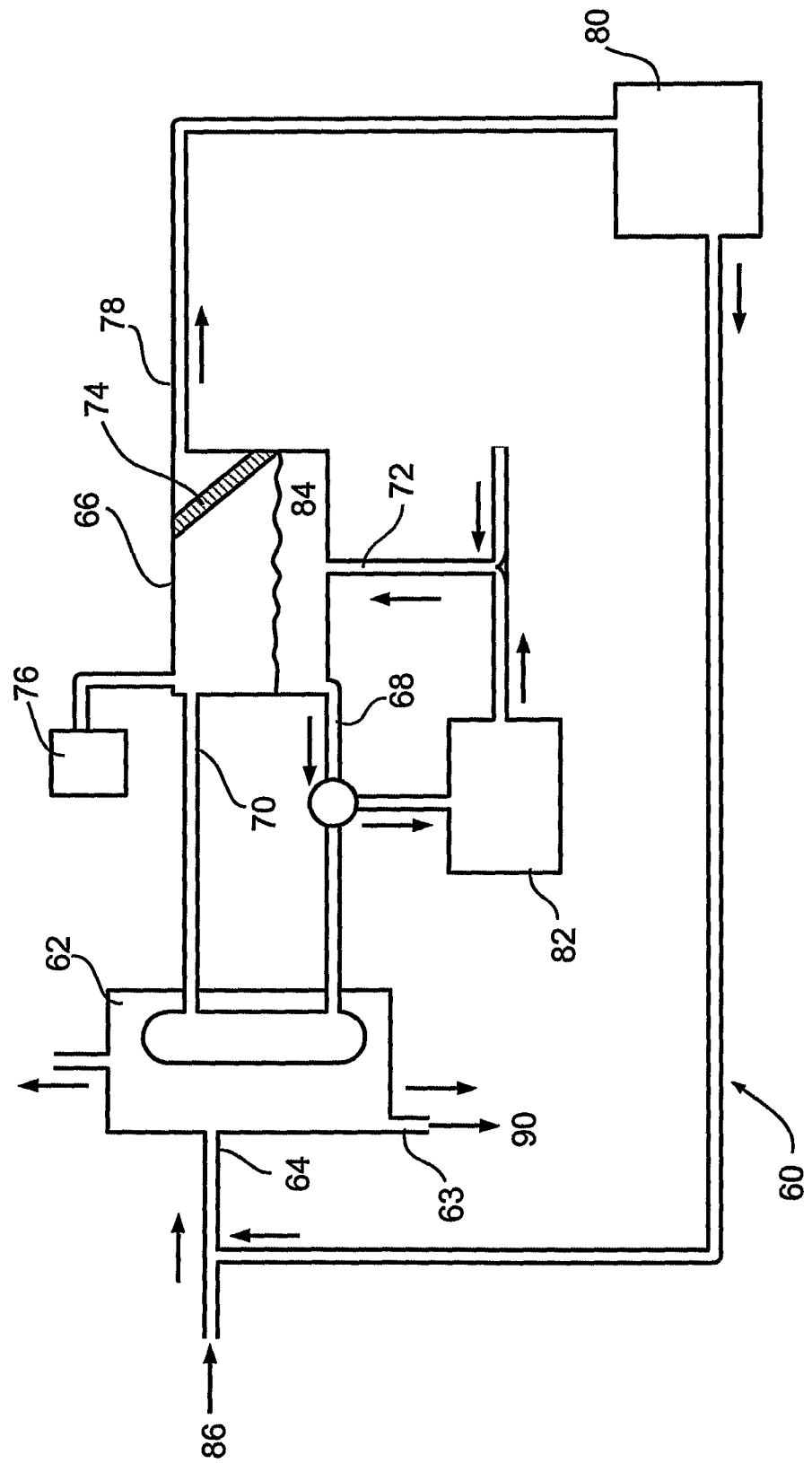
FIGS. 3A and 3B are schematic depictions of a mechanical vapor compression unit useful in implementing the teachings of the present invention.

A vapor compression (VC) unit 60 useful in implementing embodiments of the present invention is schematically depicted in FIG. 3A. VC unit 60 comprises a number of subunits.

A first subunit is a heat exchanger 62, including a steam inlet 64 to introduce heat into heat exchanger 62 and a fresh water outlet 63.

A second subunit, functionally associated with heat exchanger 62 is a flash chamber 66 provided with a brine outlet 68, a hot brine inlet 70, a fresh brine inlet 72, a mist eliminator 74, a vacuum pump 76 and a steam outlet 78.

A third subunit is a compressor 80 that compresses steam received from flash chamber 66, adds energy by compression, and provides energetic steam to heat exchanger 62. In embodiments, compressor 80 is a mechanical vapor compressor operating, for example, on electrical power. In embodiments, compressor 80 is a thermal vapor recompression (TVR) subunit, operating on steam. In embodiments, a compressor 80 comprises a mechanical vapor compressor coupled to a thermal vapor compressor.

A fourth subunit is a recrystallizer subunit 82 is configured to receive brine from flash chamber 66, remove solid salt, and return the less concentrated brine to flash chamber 66.

For use, flash chamber 66 is charged with brine 84 and pump 76 is activated so as to reduce the pressure inside flash chamber 66. Steam 86 is introduced into heat exchanger 62 through steam inlet 64. The steam loses energy and condenses, exiting as fresh water 90 through fresh water outlet 63. Brine 84 is directed from flash chamber 66 out through outlet 68 into heat exchanger 62 to gain energy and reenters flash chamber 66 with an elevated temperature through inlet 70 so as to evaporate. Water droplets are separated from the steam by mist eliminator 74. The steam passes through compressor 80, gaining energy (typically to a temperature of about 120° C.-140° C.). The energetic steam enters heat exchanger 62 through steam inlet 64, and the process continues as above.

When the salt concentration of brine 84 in flash chamber 66 is sufficiently high (determined, for example, on scaling considerations) some or all of brine 84 is removed from flash chamber 66 for internment or transferred to recrystallizer 82. Recrystallizer 82 removes some of the salts from brine 84 as solids and returns the less concentrated brine 84 to flash chamber 66. The solid salt is further processed or interred. In embodiments, brine 84 is continuously bled into recrystallizer 82. Whenever required, fresh brine 84 is added to flash chamber 66, in embodiments batchwise and in embodiments continuously.

Although a flash chamber such as 66 of a vapor compression unit is typically operated at reduced pressure, in embodiments a flash chamber is operated at atmospheric pressures.

Figure 3B:
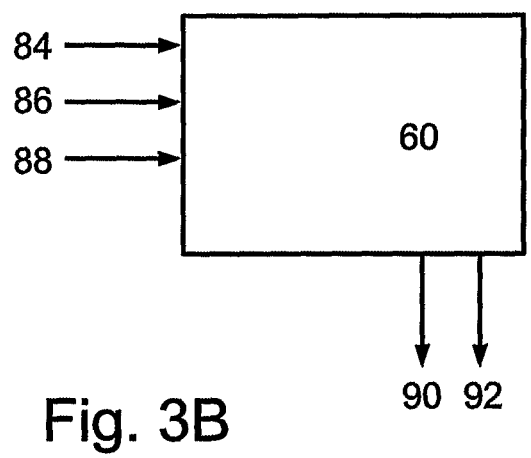

Schematically, a VC unit 60 receives brine 84, steam 86 and power 88 for compressor 80 and releases fresh water 90 and solid salt 92, see FIG. 3B.

System for Purification of Wastewater According to a First Aspect of the Invention According to a first aspect of the present invention a stripping unit, especially a steam stripping unit such as 10 or 11, is used to provide fuel for an RTO unit such as 40 and the RTO unit provides steam to generate more stripping gas for the stripping unit. It has been found that in embodiments of the present invention an RTO unit produces sufficient amounts of steam of a sufficiently high temperature (130° C.-140° C.) for efficient steam stripping from the vapor phase produced by the stripping unit.

Figure 4:
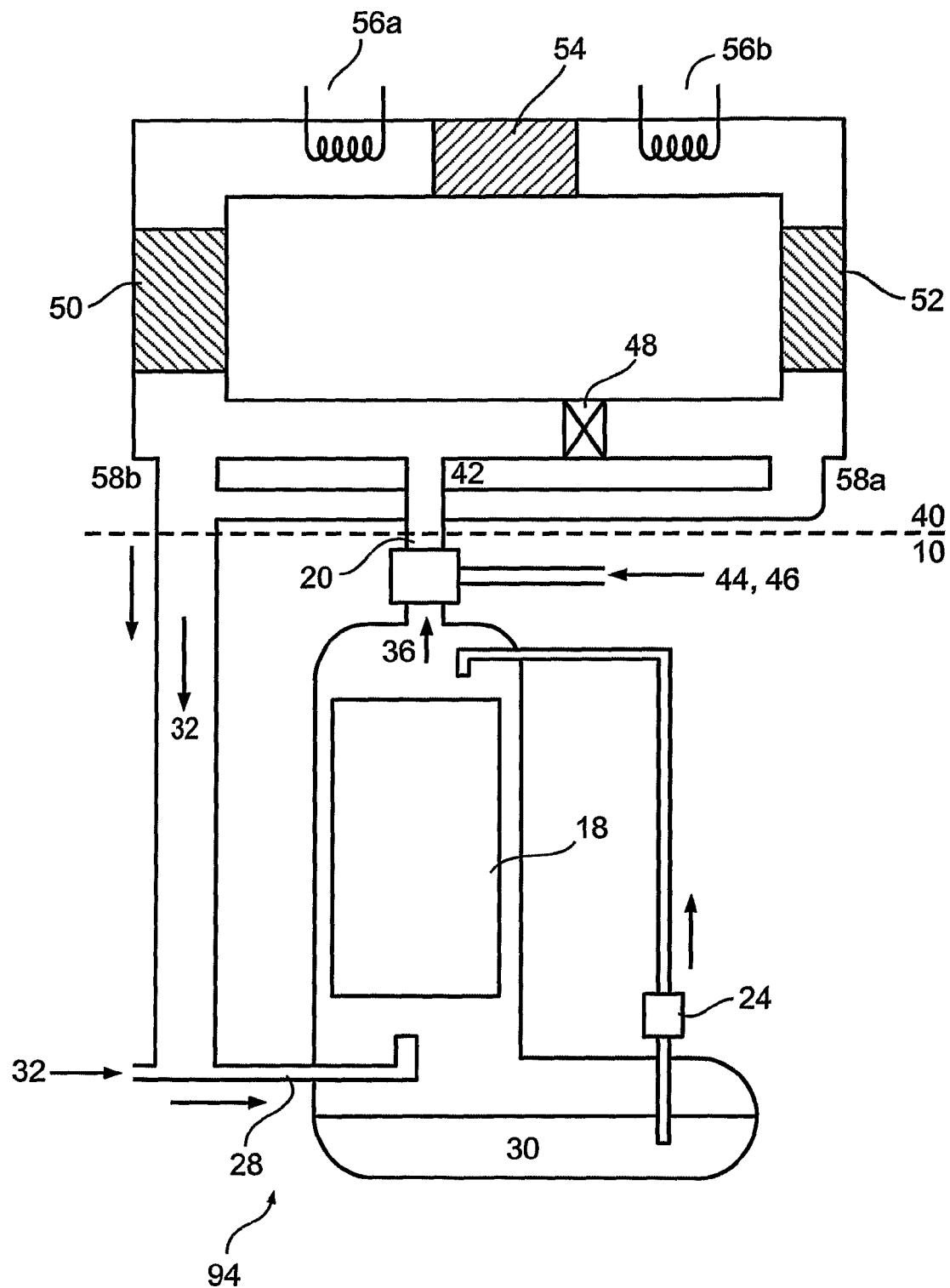
FIG. 4 is a schematic depiction of a system of the present invention including a stripping unit associated with an RTO unit.

An embodiment of a system 94 incorporating a first aspect of the present invention is schematically depicted in FIG. 4, substantially a stripping unit 10 coupled to an RTO unit 40.

Operation of stripping unit 10 of system 94 is substantially as described above, where stripping unit exhaust 20 is configured to direct a vapor 36 including steam and volatile compounds stripped from wastewater 30 as a component of a fuel air mixture into inlet 42 of RTO unit 40.

Operation of RTO unit 40 of system 94 is substantially as described above, with the exception that the process air includes not only volatile oxidizable compounds but also steam. A product of the operation of RTO unit 40 of system 94 is steam sufficient heated by oxidation of components of the fuel air mixture for use as a stripping gas by stripping unit 10 and RTO unit exhausts 58a and 58b are configured to direct the produced steam to steam inlet 28.

Steam 32 produced by an RTO unit in accordance with the teachings of the present invention is substantially devoid of oxygen. When passing through the stripping column of stripping unit 10, steam 32 strips oxygen from wastewater 30, but usually in amounts insufficient for producing a combustible fuel air mixture. Therefore, in embodiments, an exhaust such as 20 of a stripping unit such as 10 is provided with an oxidation agent inlet 44 (in embodiments functionally associated with a steam oxygen content monitor) where the vapor phase produced by the stripping unit is mixed with a sufficient amount of oxygen so that the RTO unit is supplied with a combustible feed. In embodiments, an auxiliary fuel inlet 46 is also provided for operation when wastewater having insufficient VOCs is processed.

When a system such as system 94 is started, it is generally necessary to invest energy in the form of externally produced steam 32 to operate a stripping unit 10, as well as auxiliary fuel and power to heating elements 56*a* and 56*b* to operate RTO unit 40.

Although system 94 depicted in the present invention is depicted as comprising a batch stripping unit such as 10 associated with an RTO unit in accordance with the teachings of the present invention, in embodiments a system of the present invention comprises a continuous stripping unit such as 11 associated with an RTO unit in accordance with the teachings of the present invention.

Surprisingly, it has been found that embodiments of a system of the present invention constituting a stripping unit and an RTO unit operate self-sufficiently that is, excepting for start-up, requiring little or no fuel or energy input to the RTO to entirely incinerate the volatile compounds in the wastewater and requiring little or no steam input to effectively strip the wastewater. The stripping unit provides substantially enough fuel to the RTO unit to operate without addition of extra heat. The RTO unit provides substantially enough steam to operate the stripping unit without any substantial addition of externally produced steam. Under certain conditions, it has been found that a system such as 94 of the first aspect of the present invention is so efficient as to produce steam in amounts beyond what is needed for self sufficiency. Such self-sufficiency and even excess is in part contingent on the wastewater fed to the stripping unit including sufficient VOCs, e.g., at least about 1 g $1^{-1}$ VOCs, at least about 5 g $1^{-1}$ VOCs and even at least about 10 g $1^{-1}$ VOCs.

Under certain conditions, the practical implementation of embodiments of the first aspect of the present invention is challenging. Oxidation of volatile compounds in accordance with the teachings of the first aspect of the present invention may produce acidic combustion products such as NOx, $SO_2$, HBr, HCl and $CO_2$. The combustion products are carried with the steam produced in the RTO unit and acidify the wastewater in the stripping unit. To neutralize the acid, in embodiments a base (such as NaOH) is added to the wastewater. In embodiments, this is highly advantageous, the stripping unit also acting as a scrubber. For example, toxic or corrosive products such as NOx, $SO_2$, HCl or HBr are not released with the exhaust vapor, but rather enter the wastewater and react with the base to form a salt that remains in the wastewater. Thus, in embodiments, harmful, toxic or corrosive products are trapped and neutralized in the stripped wastewater.

If the wastewater includes volatile acids, for example acetic acid or formic acid, the addition of a base may significantly reduce the volatility of the acid. Further, as stripping proceeds, the concentrations of salts formed by combination of acid and the base in the wastewater in the sump steadily rise so as to constitute a brine, reducing stripping efficiency, increasing corrosion and increasing the rate of sediment buildup in the packing of the stripping column.

As noted above, a challenge in the art is the processing of wastewater including non-volatile contaminants. Such wastewater is often produced in a stripping unit and when removed must be processed to destroy or concentrate the contaminants. System for Purification of Wastewater According to a Second Aspect of the Invention According to a second aspect of the present invention an RTO unit, such as an RTO unit 40, is used to provide steam to a vapor compression (VC) unit.

Figure 5:
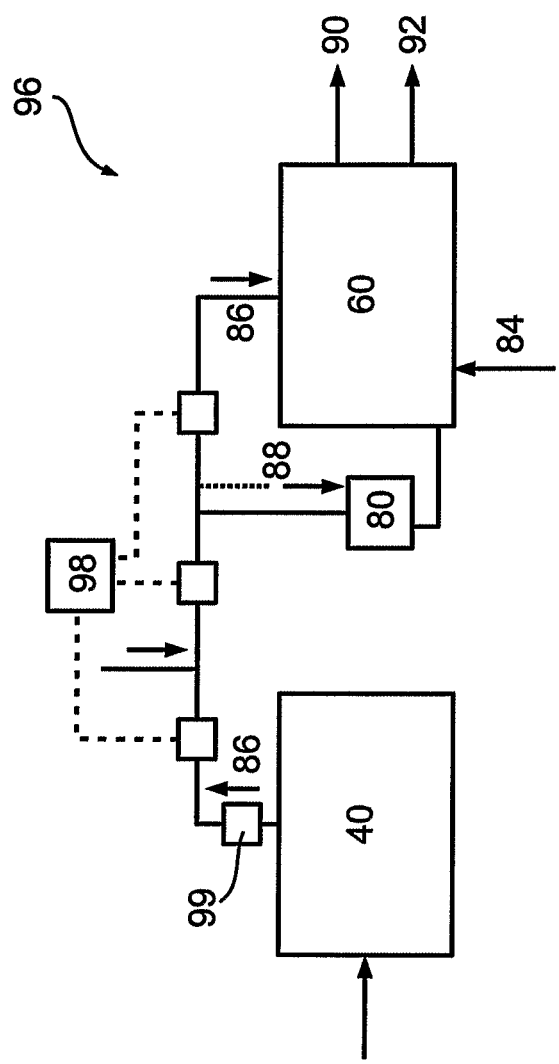
FIG. 5 is a schematic depiction of a system of the present invention including an RTO unit associated with a VC unit.

An embodiment of a system 96 incorporating a second aspect of the present invention is schematically depicted in FIG. 5, substantially an RTO unit 40 coupled to a VC unit 60.

Operation of RTO unit 40 of system 96 is substantially as described above, that is, RTO unit 40 produces steam from a vapor including steam and fuel. The produced steam is directed to VC unit 60.

Operation of VC unit 60 of system 96 is substantially as described above, that is, steam 86 enters a heat exchanger to produce fresh water 90 and heat brine 84. Water evaporates from brine 84 as steam and is directed to a compressor 80 which adds energy to the steam which is directed to the heat exchanger to produce fresh water 90 and heat brine 84. Intermittently or continuously at least some of the salts 92 in brine 84 are extracted as solids using a recrystallizer.

In embodiments, compressor 80 comprises a mechanical compressor and is provided with power for operation. In embodiments, compressor 80 comprises a TVR unit that requires steam for operation. In embodiments, a TVR unit is provided with an external source of steam. In embodiments, a TVR unit is provided with steam from the RTO unit (88, FIG. 5).

Embodiments of systems of the present invention, such as system 96 comprise three or four sources of steam: an external boiler especially for start-up, an RTO unit such as 40, a compressor 80 of VC unit 60 and, in embodiments, dedicated boilers for operation of a TVR of a compressor 80. Embodiments of systems such as system 96 comprise one or two steam users: a VC unit 60, and in embodiments, a TVR of a compressor 80. In system 96, a steam bus controlled by a steam distributor 98 is configured to dynamically allocate steam from an external source of steam, from RTO unit 40 and from compressor 80 to VC unit 60, and if applicable to a TVR unit or a boiler supplying a TVR unit with steam.

In embodiments, substantially all the steam produced by an RTO unit is dedicated to operating a VC unit. In embodiments, substantially all the steam produced by an RTO unit is distributed in a fixed ratio between a VC unit and a TVR. In embodiments, substantially all the steam produced by an RTO unit is distributed between a VC unit and a TVR in a changing ratio dynamically determined upon demand, for example by a steam distributor such as 98. In embodiments, the steam produced by an RTO unit is distributed in a ratio of about 20:80, about 35:65, about 50:50, about 65:35 and even about 80:20 between a VC unit and a TVR.

In embodiments, substantially all the steam produced by a VC unit is dedicated to operating the VC unit. In embodiments, substantially all the steam produced by a VC unit is distributed in a fixed ratio between the VC unit and a TVR. In embodiments, substantially all the steam produced by a VC unit is distributed between the VC unit and a TVR in a changing ratio dynamically determined upon demand, for example by a steam distributor such as 98. In embodiments, the steam produced by a VC unit is distributed in a ratio of about 20:80, about 35:65, about 50:50, about 65:35 and even about 80:20 between the VC unit and a TVR.

In embodiments, the steam produced by a VC unit and an RTO unit are combined and distributed in a fixed or in a changing ratio dynamically determined upon demand, to the VC unit and a TVR.

In embodiments, substantially all the steam for operating a TVR unit is provided by a dedicated steam boiler. In embodiments, at least some of the steam for operating a TVR unit is provided by a steam boiler that is also configured to supply other units with steam, for example the VC unit at start up. In embodiments, either or both the VC unit and the RTO unit provide steam to operate a TVR unit. In embodiments, either or both the VC unit and the RTO unit provide steam to feed a boiler that provides steam to operate a TVR unit.

A scrubber 99 is used to remove corrosive, toxic or otherwise undesirable products such as NOx, $SO_2$, HCl or HBr from the steam produced by an RTO unit such as 40 in embodiments where the steam includes or potentially includes substantial proportions of such products.

As steam produced by an RTO unit such as 40 generally includes $CO_2$, a heat exchanger of a VC unit such as 60 used in implementing the teachings of the present invention is provided with a $CO_2$ outlet. During operation, $CO_2$ is vented as a gas from the heat exchanger to the environment, while the condensed steam exits as fresh water 90. In embodiments, there are zero liquid emissions as vapor.

System for Purification of Wastewater According to the Invention

Embodiments of the present invention are related to both the first aspect of the present invention and to the second aspect of the present invention.

Embodiments of the present invention include a stripping unit (whether batch or continuous) functionally associated with an RTO unit to provide the RTO unit with fuel while the RTO unit provides steam to a VC unit. Embodiments of the present invention include a stripping unit functionally associated with an RTO unit to provide the RTO unit with fuel while the RTO unit provides steam to a VC unit and steam as a stripping gas for the stripping unit. In such embodiments, brine or wastewater including non-volatile contaminants such as detergents, salts and metal ions.

Figure 6:
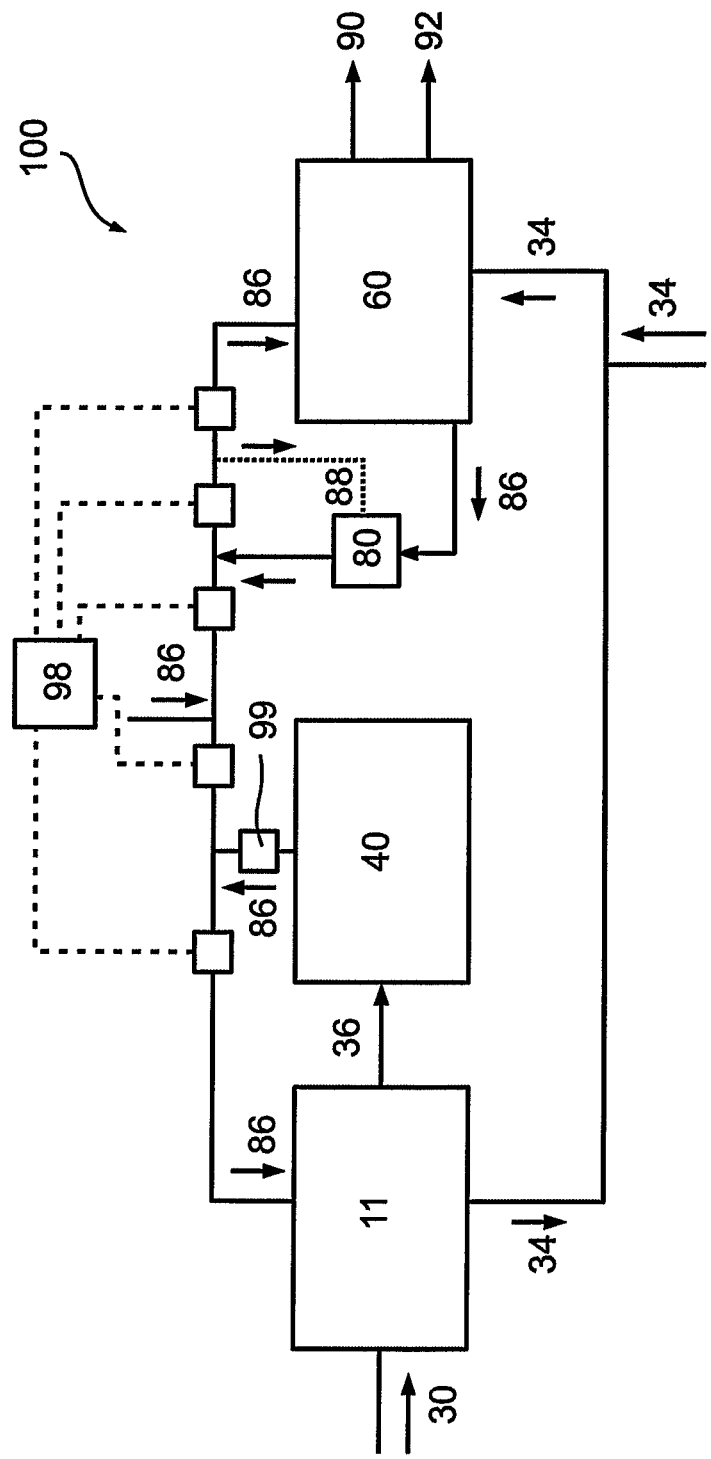
FIG. 6 is a schematic depiction of a system of the present invention including a stripping unit associated with an RTO unit associated with a VC unit.

An embodiment of the present invention, a system 100 is schematically depicted in FIG. 6, substantially a continuously stripping unit 11 coupled to an RTO unit 40 coupled to a VC unit 60, in accordance with the teachings of the present invention as described above.

System 100 is substantially a waste processing system that receives wastewater 30 that is converted to $CO_2$, fresh water 90 and a salt mixture 92.

Stripping unit 11 receives wastewater 30 and steam 86 as a stripping gas and produces brine 34 and a vapor 36 including steam and volatile compounds. Sources of steam 32 for stripping unit 11 include an external boiler, RTO unit 40 and/or VC unit 60. Operation of stripping unit 11 of system 100 is substantially as described above, where stripping unit 11 is configured to direct vapor 36 including steam and volatile compounds stripped from wastewater 30 as a component of a fuel-air mixture to RTO unit 40.

RTO unit 40 receives vapor 36, oxygen and if necessary auxiliary fuel and releases energetic steam 86 including $CO_2$ and other oxidation products where substantially all the volatile compounds form wastewater 30 have been destroyed. Operation of RTO unit 40 of system 100 is substantially as described above for system 94 depicted in FIG. 4 so that a product of the operation of RTO unit 40 is steam 86 that carries a portion of the energy released during oxidation and destruction of components of vapor 36. In system 100, RTO unit 40 is configured to provide steam 86 to a steam bus controlled by steam distributor 98 which is configured to provide steam 86 for operation of VC unit 60 and as a stripping gas for stripping unit 11. Provision is made to allow the escape of $CO_2$ from the steam produced by RTO unit 40. If necessary, provision is made, for example by the addition of a scrubber 99, to remove corrosive, toxic or otherwise undesirable products from steam 86 produced by RTO unit 40.

VC unit 60 receives steam 86 and brine 34 (from stripping unit 11 and/or brine from another source) and produces fresh water 90 and a salt mixture 92. Sources of steam 32 for VC unit 60 include an external boiler, RTO unit 40 and/or VC unit 60. Operation of VC unit 60 of system 100 is substantially as described above, that is, steam 86 enters a heat exchanger to produce fresh water 90 and heat brine 34. Water evaporates from brine 34 and is directed to a compressor 80 which adds energy to the water which is directed to the heat exchanger to produce fresh water 90 and heat brine 34. Intermittently or continuously at least some of the salts 92 in brine 84 are extracted as solids using a recrystallizer.

Embodiments of systems of the present invention, such as system 100 comprise three or four sources of steam: an external boiler especially for start-up, an RTO unit such as 40, a compressor 80 of VC unit 60 and, in embodiments, dedicated boilers for operation of a TVR of a compressor 80. Embodiments of systems such as system 100 comprise three steam users: a stripping unit 11, a VC unit 60, and in embodiments, a TVR of a compressor 80. In system 100, a steam bus controlled by steam distributor 98 is configured to dynamically allocate steam from an external source of steam, from RTO unit 40 and from compressor 80 to stripping unit 10, VC unit 60, and if applicable to a TVR unit or a boiler supplying a TVR unit with steam.

In embodiments, substantially all the steam produced by an RTO unit is dedicated to operating a stripping unit. In embodiments, substantially all the steam produced by an RTO unit is dedicated to operating a VC unit. In embodiments, substantially all the steam produced by an RTO unit is distributed in a fixed ratio between a stripping unit and a VC unit. In embodiments, substantially all the steam produced by an RTO unit is distributed between a stripping unit and a VC unit in a changing ratio dynamically determined upon demand, for example by a steam distributor such as 98. In embodiments, the steam produced by an RTO unit is distributed in a ratio of about 20:80, about 35:65, about 50:50, about 65:35 and even about 80:20 between a stripping unit and a VC unit.

In embodiments, substantially all the steam produced by a VC unit is dedicated to operating the VC unit. In embodiments, substantially all the steam produced by a VC unit is dedicated to operating a stripping unit. In embodiments, substantially all the steam produced by an VC unit is distributed in a fixed ratio between a stripping unit and the VC unit. In embodiments, substantially all the steam produced by a VC unit is distributed between a stripping unit and the VC unit in a changing ratio dynamically determined upon demand, for example by steam bus controlled by a steam distributor such as 98. In embodiments, the steam produced by a VC unit is distributed in a ratio of at least bout 20:80, at least about 35:65, at least about 50:50, at least about 65:35 and even at least about 80:20 between a stripping unit and the VC unit.

In embodiments, the steam produced by a VC unit and an RTO unit are combined and distributed in a fixed or in a changing ratio dynamically determined upon demand, to the VC unit and a stripping unit.

In embodiments, substantially all the steam for operating a TVR unit is provided by a dedicated steam boiler. In embodiments, at least some of the steam for operating a TVR unit is provided by a steam boiler that is also configured to supply other units with steam, for example the VC unit or a stripping unit at start up. In embodiments, either or both the VC unit and the RTO unit provide steam to operate a TVR unit. In embodiments, either or both the VC unit and the RTO unit provide steam to feed a boiler that provides steam to operate a TVR unit.

Surprisingly, it has been found that embodiments of a system of the present invention constituting a stripping unit, an RTO unit and a VC unit such as system 100 depicted in FIG. 6 operate self-sufficiently that is, excepting for start-up, requiring little or no fuel or energy input to the RTO to entirely incinerate the volatile compounds in the waste water, requiring little or no steam input to effectively strip the wastewater, and requiring little or no steam input to operate VC unit 60 (excepting energy added through a compressor of a VC unit, such as a boiler to increase the energy content of steam used for operating a TVR). The stripping unit provides substantially enough fuel to the RTO unit to operate without addition of extra heat. The RTO unit and the VC unit together provide substantially enough steam to operate the stripping unit and the VC unit without any substantial addition of externally produced steam (excepting for operation of a TVR unit). Such self-sufficiency is in part contingent on the wastewater fed to the stripping unit including sufficient VOCs, e.g., at least about 1 g $l^{-1}$ VOCs, at least about 5 g $l^{-1}$ VOCs and even at least about 10 g $l^{-1}$ VOCs.

In the embodiments depicted above, systems of the present invention are provided with steam stripping units that provide volatile compound laden steam as fuel for an RTO unit. In non-depicted embodiments, for example embodiments analogous to system 100 depicted in FIG. 6, are provided with an air stripping unit instead of a steam stripping unit. In such embodiments, the RTO unit receives volatile compound laden air from the air stripping unit as fuel to generate heat, which is transferred by way of an appropriately modified heat exchanger to a heat exchanger of a VC unit such as 60 or as stripping gas back to the stripping unit.

In the embodiments depicted above, fresh water condensed in a heat exchanger of a VC unit was recovered for use. In embodiments, the condensed water is at elevated temperature and is used to heat a working fluid (e.g., $NH_3$, isobutane, isopentane, Freon) to drive a turbine to generate electricity in the usual way.

In embodiments depicted above, a flash chamber is operated at reduced pressure by use of a vacuum pump. In embodiments, a flash chamber is operated at atmospheric pressures, for example, in fluid communication with the atmosphere.

A system of the present invention is exceptionally suited for treating mixtures of different wastewaters from different industrial processes. Thus in embodiments, wastewater from one or more industrial processes are mixed together and feed to a system of the present invention for simultaneous processing.

The teachings of the present invention are suitable for processing of wastewater from many different types of processes including, but not limited to chemistry and pharmaceutical production processes (e.g., where phase transfer catalysis, phase separation extraction and chromatography are used), metal working (especially coating, galvanization and etching processes) and many other processes which include washing of an industrial product with aqueous solutions including detergents and additives.

The teachings of the present invention are suitable for processing wastewater including many different volatile compounds, especially indefinite cocktails of different volatile compounds, including, but not limited to acetic acid, acrylonitrile alcohols, aldehydes, aliphatics, amides, ammonia, aromatics, benzenes, bromo-compounds, bromochloropropane, butadienes, butanol, chloro-compounds, chloroform, cycloalkanes, cycloalkenes, dichloromethane, ether, ethyl acetate, formic acid, gasoline, hetero-aromatics, hydrocarbons, hydrogen sulfide, isopropanol, methacrylonitrile, methanol, methyl acetate, methylene chloride, n-propanol, organic acids, perchloro ethylene, phenols, propanols, pyridine, toluene, trichloroethylene, trichloroethane, triethylamine, xylene and mixtures thereof.

Additional embodiment of the first aspect of the present invention are depicted in FIGS. 7A, 7B, 7C and 7D, where a steam stripping unit 10 is used to provide fuel for an RTO unit 40 and RTO unit 40 provides steam as stripping gas for stripping unit 10.

Figure 7A:
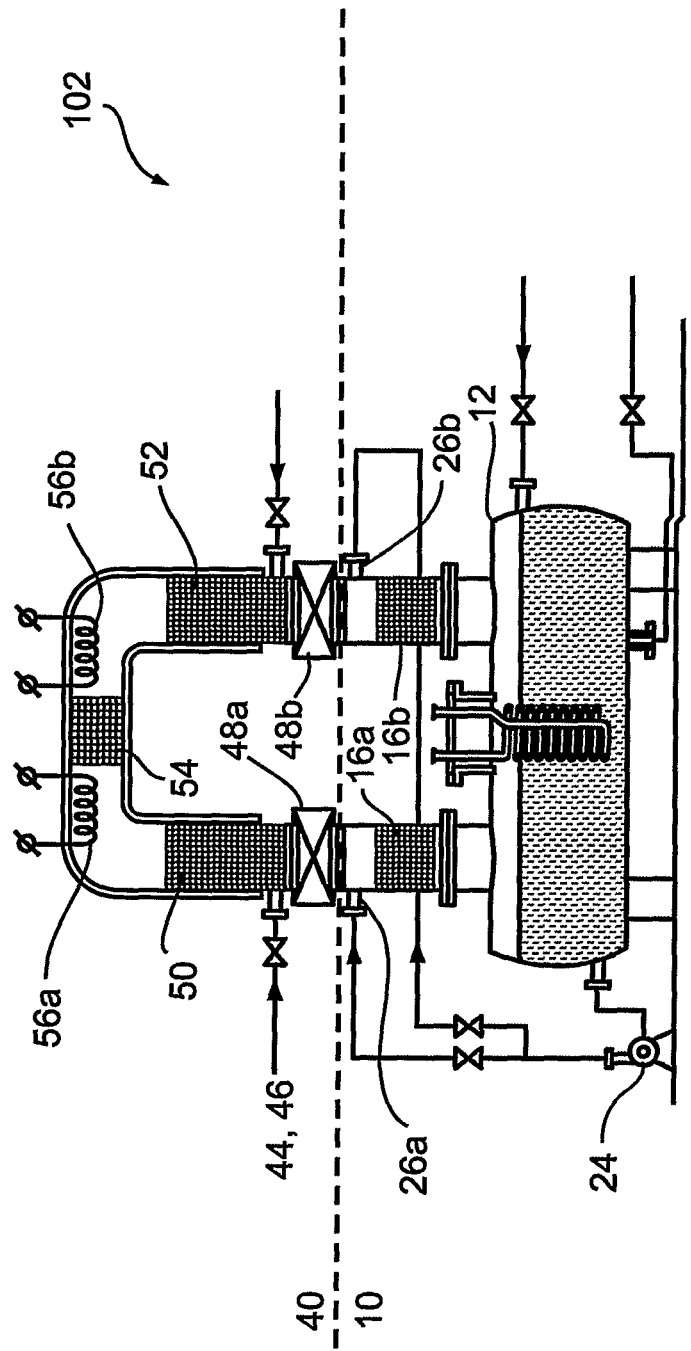
FIGS. 7A-7D are schematic depictions of systems of the present invention including a stripping unit associated with an RTO unit.

In FIG. 7A, a system 102 of the present invention comprises a steam stripping unit 10 coupled to an RTO unit 40. Steam stripping unit 10 of FIG. 7A is substantially similar to steam stripping unit 10 depicted in FIG. 1A while RTO unit 40 is substantially similar to RTO unit 40 depicted in FIG. 2. In FIG. 7A, a sump 12 is associated with two stripping columns 16a and 16b, each stripping column 16a and 16b in direct fluid communication with a single heat exchanger 50 and 52, respectively of RTO unit 40. Heat exchangers 50 and 52 are disposed on either side of an oxidizer 54. Physically separating between stripping column 16a and heat exchanger 50 is reversible fan 48a. Physically separating between stripping column 16b and heat exchanger 52 is reversible fan 48b.

Operation of system 102 is clear to one skilled in the art upon perusal of the description herein. For a given period of time, fans 48a and 48b are activated to force gas in a clockwise direction, stripping column 16a is activated to strip water in sump 12, heat exchanger 50 is operative to transfer heat to a gas passing therethrough and heat exchanger 52 is operative to accept heat from an exhaust produced by oxidizer 54. During the period of time, volatile compounds are stripped from water and carried away in a vapor including steam in stripping column 26a, and transferred along with the steam past heat exchanger 50 to be oxidized in oxidizer 54. Oxidation of the volatile compounds heats the steam that passes heat exchanger 52, transferring some heat to heat exchanger 52. The steam continues in a clockwise direction, passes over the surface of water in sump 12 and passes up through stripping column 26a as a stripping gas. When sufficient time has passed to sufficiently heat heat exchanger 52, fans 48a and 48b are reversed to force gas in a counterclockwise direction, stripping column 16b is activated to strip water in sump 12, heat exchanger 52 is operative to transfer heat to a gas passing therethrough and heat exchanger 50 is operative to accept heat from an exhaust produced by oxidizer 54.

Figure 7B:
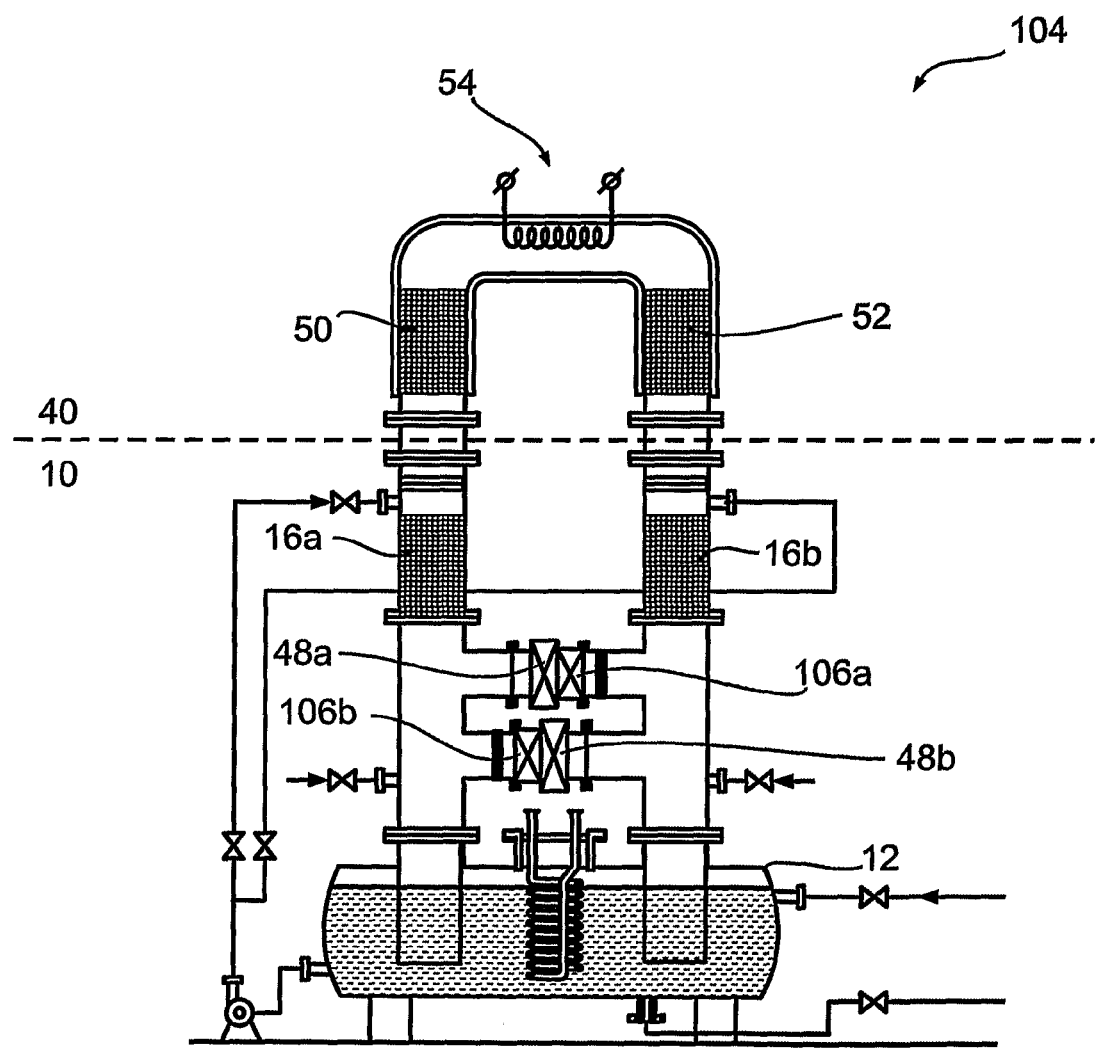

In FIG. 7B, a system 104 of the present invention comprises a steam stripping unit 10 coupled to an RTO unit 40. Steam stripping unit 10 of FIG. 7B is substantially similar to steam stripping unit 10 depicted in FIG. 1A while RTO unit 40 is substantially similar to RTO unit 40 depicted in FIG. 2. In FIG. 7B, a sump 12 is associated with two stripping columns 16a and 16b, each stripping column 16a and 16b in direct fluid communication with a single heat exchanger 50 and 52, respectively of RTO unit 40. Heat exchangers 50 and 52 are disposed on either side of an oxidizer 54. Between the pipe containing stripping column 16a and heat exchanger 50 and the pipe containing stripping column 16b and heat exchanger 52 are two crosspipes. The upper crosspipe contains fan 48a and a damper 106a and the lower crosspipe contains fan 48b and damper 106b.

Operation of system 104 is analogous to operation of system 102 and is clear to one skilled in the art upon perusal of the description herein. Unlike system 102, the direction of airflow is determined by opening of a damper 106a or 106b and activation of an associated fan 48a or 48b, respectively. Stripping steam generated at oxidizer 54 does not pass over the surface of water in sump 12 (which is prevented by immersion of the inlets under the water level), but rather through a crosspipe having an open damper 106a or 106b and an activated fan 48a or 48b.

Figure 7C:
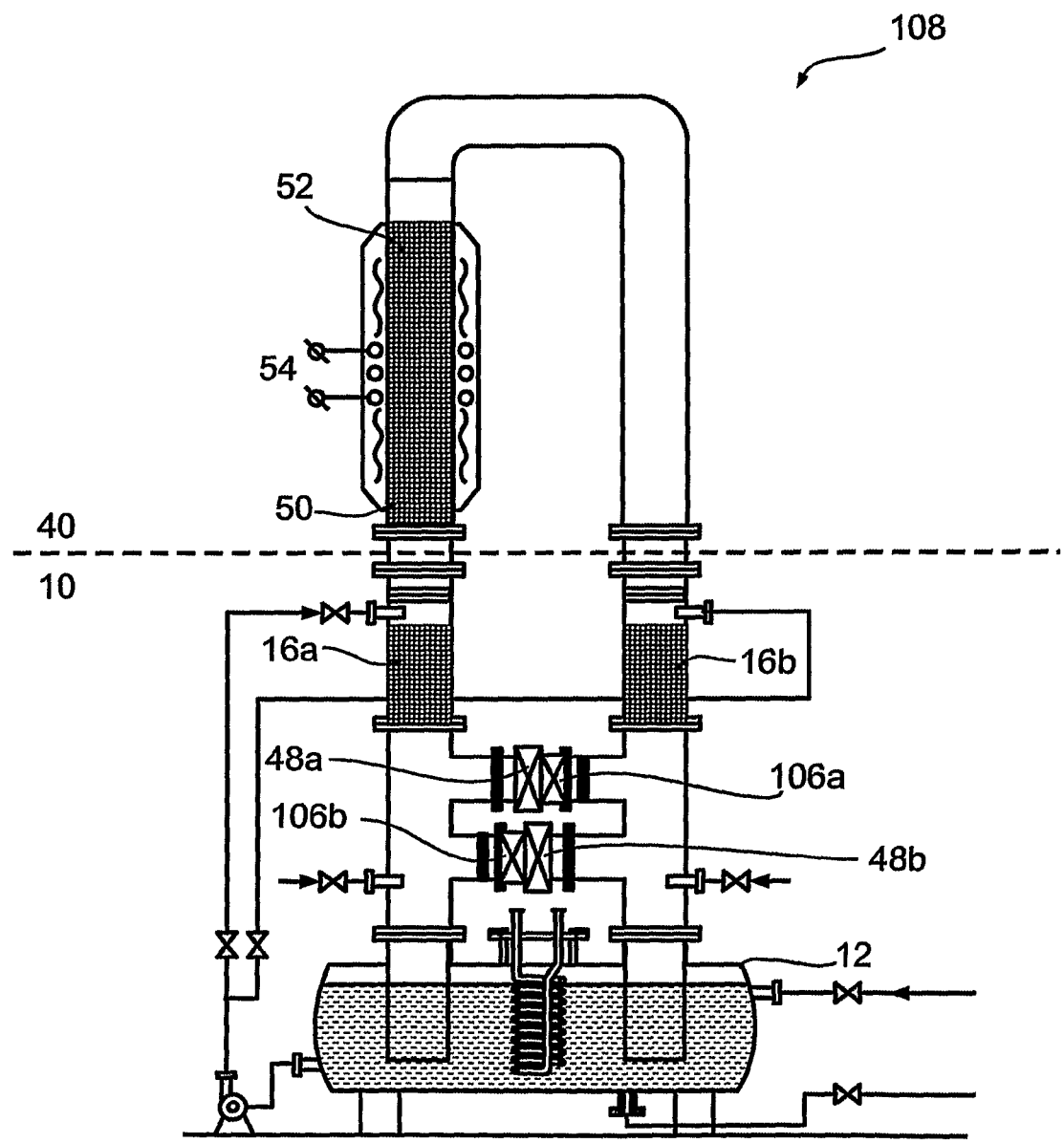

In FIG. 7C, a system 108 of the present invention comprises a steam stripping unit 10 coupled to an RTO unit 40. Steam stripping unit 10 of FIG. 7C is substantially similar to steam stripping unit 10 depicted in FIG. 1A while RTO unit 40 is substantially similar to RTO unit 40 depicted in FIG. 2. System 108 is substantially similar to system 104 depicted in FIG. 7B excepting that in RTO unit 40 heat exchangers 50 and 52 and oxidizer 54 make up substantially a single continuous unit.

Operation of system 108 is analogous to operation of system 104 and is clear to one skilled in the art upon perusal of the description herein.

Figure 7D:
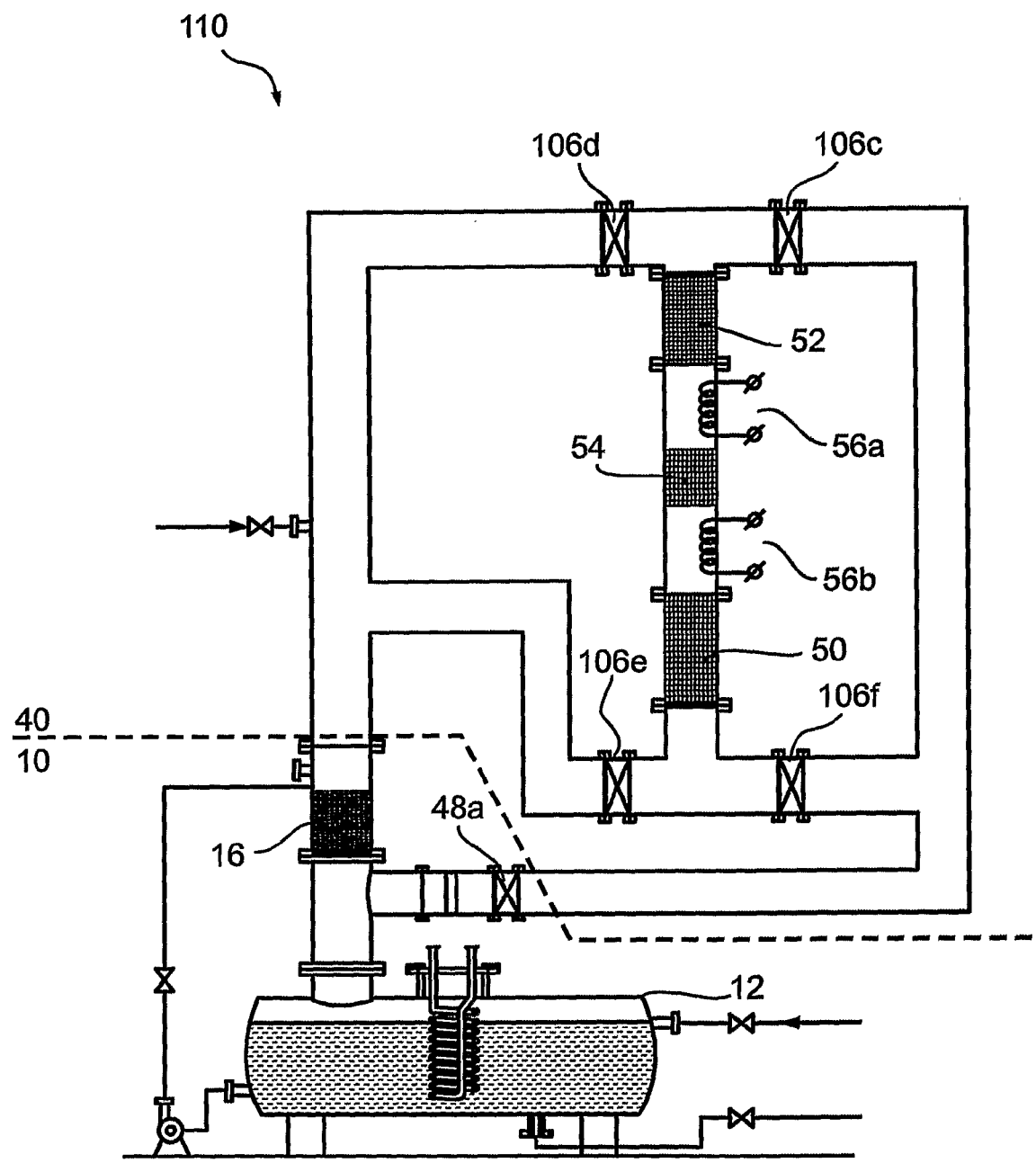

In FIG. 7D, a system 110 of the present invention comprises a steam stripping unit 10 coupled to an RTO unit 40. Steam stripping unit 10 of FIG. 7D is substantially similar to steam stripping unit 10 depicted in FIG. 1A while RTO unit 40 is substantially similar to RTO unit 40 depicted in FIG. 2. In FIG. 7D, a sump 12 is associated with a single stripping column 16 in fluid communication with RTO unit 40. Heat exchangers 50 and 52 are disposed on either side of an oxidizer 54. The direction of flow through steam stripping column 16 is determined by fan 48a, that is operative to drive steam in a clockwise fashion upwards through stream stripping column 16. The direction of flow through RTO unit 40 is determined by fan 48a and by dampers 106a, 106b, 106c and 106d. In order to direct air flow so as to pass through heat exchanger 50 to accept heat from heat exchanger 50, to oxidize in oxidizer 54 and to transfer heat to heat exchanger 52 and then to stripping column 16, dampers 106c and 106e are simultaneously opened while dampers 106d and 106f are closed. To reverse the air flow so as to pass through heat exchanger 52 to accept heat from heat exchanger 52, to oxidize in oxidizer 54 and to transfer heat to heat exchanger 50 and then to stripping column 16, dampers 106d and 106f are simultaneously opened while dampers 106c and 106e are closed.

Operation of system 110 is analogous to operation of system 108 and is clear to one skilled in the art upon perusal of the description herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. Although the invention has been described in conjunction with specific embodiments thereof, it is evident that many alternatives, modifications and variations will be apparent to those skilled in the art. Accordingly, the present invention is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In case of conflict, the specification herein, including definitions, prevails. Citation or identification of any reference in this application shall not be construed as an admission that such reference is available as prior art to the present invention.

What is claimed is:

1. A system for processing industrial waste water contaminated by volatile compounds and non-volatile salts and metal ions, comprising:
   a) a regenerative thermal oxidation (RTO) unit, comprising a waste water inlet, a process air inlet, an RTO steam exhaust, an oxidizer, and heat exchangers disposed on the inlet and outlet sides of said oxidizer, adapted for pre-heating process air that enters said oxidizer with heat generated in said oxidizer; wherein each of said disposed heat exchangers reversibly operates as a hot heat exchanger for transferring heat to said process air entering said oxidizer and as a cool heat exchanger for being heated by hot exhaust exiting said oxidizer; and
   b) a vapor compression (VC) unit, coupled to said RTO unit steam exhaust, and comprising a steam inlet, a brine inlet, and a flash chamber;
   wherein said RTO steam exhaust is directly connected to and in fluid communication with said VC unit steam inlet, such that when operating, said RTO exhaust directs steam from said RTO unit into said VC unit steam inlet to provide energy for operating said VC unit to separate solids from incoming brine.

2. The system of claim 1, wherein said flash chamber comprises a vacuum-producing component for operation of said flash chamber at reduced pressure.

3. The system of claim 1, wherein said flash chamber is configured for operation at atmospheric pressure.

4. The system of claim 1, wherein one of said disposed heat exchangers operates as said hot heat exchanger during other of said disposed heat exchangers operating as said cool heat exchanger.

5. The system of claim 1, wherein said disposed heat exchangers are configured for reversing operation as said hot and cool heat exchangers according to hotness or heating of said cool heat exchanger.

6. The system of claim 1, further comprising a reversible fan configured to drive said process air through said RTO unit towards said oxidizer.

7. The system of claim 1, wherein said oxidizer is selected from the group consisting of a thermal oxidizer, a flare oxidizer, and a thermocatalytic oxidizer.

8. The system of claim 1, wherein said VC unit further comprises a compressor for compressing steam received from said flash chamber.

9. The system of claim 8, wherein said compressor is a thermal vapor recompression (TVR) subunit, operating on steam.

10. The system of claim 8, further comprising a steam bus controlled by a steam distributor, configured to dynamically allocate steam from an external source of steam, from said RTO unit, and from said compressor, to said VC unit.

11. The system of claim 1, wherein said flash chamber comprises a fresh brine inlet, a hot brine inlet, and a brine outlet.

12. The system of claim 11, wherein said VC unit further comprises a heat exchanger operatively connected to said steam inlet, said brine outlet, and said hot brine inlet, and configured for heating brine charged to said flash chamber.

13. The system of claim 1, further wherein the RTO waste water inlet is provided by an output of a stripping unit comprising a stripping column, a waste water inlet, a stripping gas inlet and a stripping unit exhaust, wherein said RTO steam exhaust is directly connected to and in fluid communication with said stripping gas inlet, such that when operating, said RTO steam exhaust directs hot exhaust from said RTO unit into said stripping gas inlet as a stripping gas of said stripping unit.

14. The system of claim 13, wherein said stripping unit is a steam stripping unit.

15. The system of claim 13, wherein said stripping unit is a batch stripping unit comprising a sump.

16. The system of claim 15, further comprising a reagent addition port functionally associated with said sump.

17. The system of claim 13, wherein said stripping unit is a continuous flow stripping unit.

* * * * *